US007568157B1

(12) United States Patent
Orr

(10) Patent No.: US 7,568,157 B1
(45) Date of Patent: Jul. 28, 2009

(54) SCREEN BOOK MAKER

(76) Inventor: Joseph K. Orr, 328 Flatbush PMB 219, Brooklyn, NY (US) 11238

( * ) Notice: Subject to any disclaimer, the term of this patent is extended or adjusted under 35 U.S.C. 154(b) by 2037 days.

(21) Appl. No.: 09/645,922

(22) Filed: Aug. 24, 2000

(51) Int. Cl.
*G06F 17/00* (2006.01)

(52) U.S. Cl. .................. 715/273; 715/234; 715/255; 434/322

(58) Field of Classification Search ............... 715/500, 715/513, 530, 704, 526, 273, 234, 255; 345/708; 434/118, 350, 332; 436/86, 518; 704/3, 704/9; 705/27; 707/3, 10
See application file for complete search history.

(56) References Cited

U.S. PATENT DOCUMENTS

| | | | | | |
|---|---|---|---|---|---|
| 4,772,206 | A | * | 9/1988 | Kerr et al. ............... | 434/118 |
| 5,627,958 | A | * | 5/1997 | Potts et al. .............. | 345/708 |
| 5,781,785 | A | * | 7/1998 | Rowe et al. ............. | 715/513 |
| 5,827,070 | A | * | 10/1998 | Kershaw et al. ........ | 434/322 |
| 6,212,494 | B1 | | 4/2001 | Boguraev ................ | 704/9 |
| 6,404,441 | B1 | * | 6/2002 | Chailleux ................ | 715/704 |
| 6,546,230 | B1 | * | 4/2003 | Allison .................. | 434/350 |
| 6,684,369 | B1 | * | 1/2004 | Bernardo et al. ........ | 715/513 |
| 6,920,610 | B1 | * | 7/2005 | Lawton et al. .......... | 715/526 |
| 7,213,202 | B1 | * | 5/2007 | Kagle ................... | 715/517 |
| 2001/0039552 | A1 | * | 11/2001 | Killi et al. ............. | 707/500 |
| 2002/0031756 | A1 | * | 3/2002 | Holtz et al. ............ | 434/362 |
| 2003/0208473 | A1 | * | 11/2003 | Lennon ................. | 707/3 |
| 2007/0033221 | A1 | * | 2/2007 | Copperman et al. ..... | 707/103 R |
| 2007/0130339 | A1 | * | 6/2007 | Alcorn et al. ........... | 709/225 |

OTHER PUBLICATIONS

Matthews et al. "Complete Reference FrongPage 2000" (Public Release May 1, 1999, By Osborn/McGraw-Hill, Ca, USA pp. 63-69,80-99,104-105,168-177,222-231,341-343,372-375,459-463,507-509,518-521,524-525,634-635,760-767.*
Bernadette Houghton "Snaglt-32 4 .1" published on the WWW Feb. 1998 pp. 3 www.melbpc.org.au/pcupdate/9802/9802article3.htm.*
Bernadette Houghton "Snaglt/32 4 .1" published on the WWW—Feb. 1998 www.melbpc.org.au/pcupdate/9802/9802article3.htm , pp. 1-3.*

* cited by examiner

*Primary Examiner*—Doug Hutton
*Assistant Examiner*—Quoc A Tran
(74) *Attorney, Agent, or Firm*—Milde & Hoffberg LLP

(57) ABSTRACT

A computer program and method for the creation of tutorials having screen snapshots and associated text as well as other content. A testing method is provided where content created can be used to prompt the user and the user can respond by creating a snapshot of the computer screen as a response. The program may use text from a previously created page to prompt for an image that matches the text, with the option to create an answer page that can then be compared with the previously created page. A system provides for online creation, storage and retrieval of books containing pages, and for online testing, where pages are stored on a network computer, and a program-generated program allows the user to submit a screen snapshot in response to the prompt.

40 Claims, 16 Drawing Sheets

Figure 4
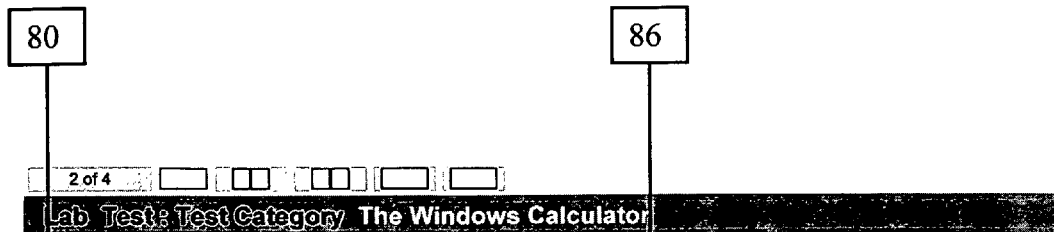
The Windows Calculator is a program that can be used for simple calculations.
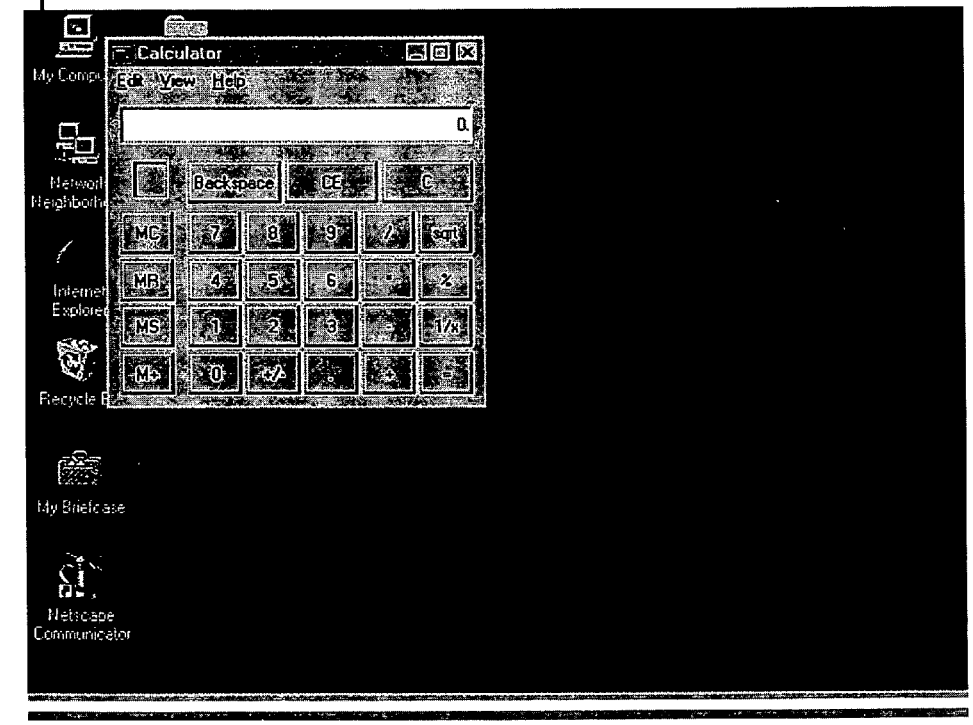

Figure 6
The Windows Calculator is a program that can be used for simple calculations.
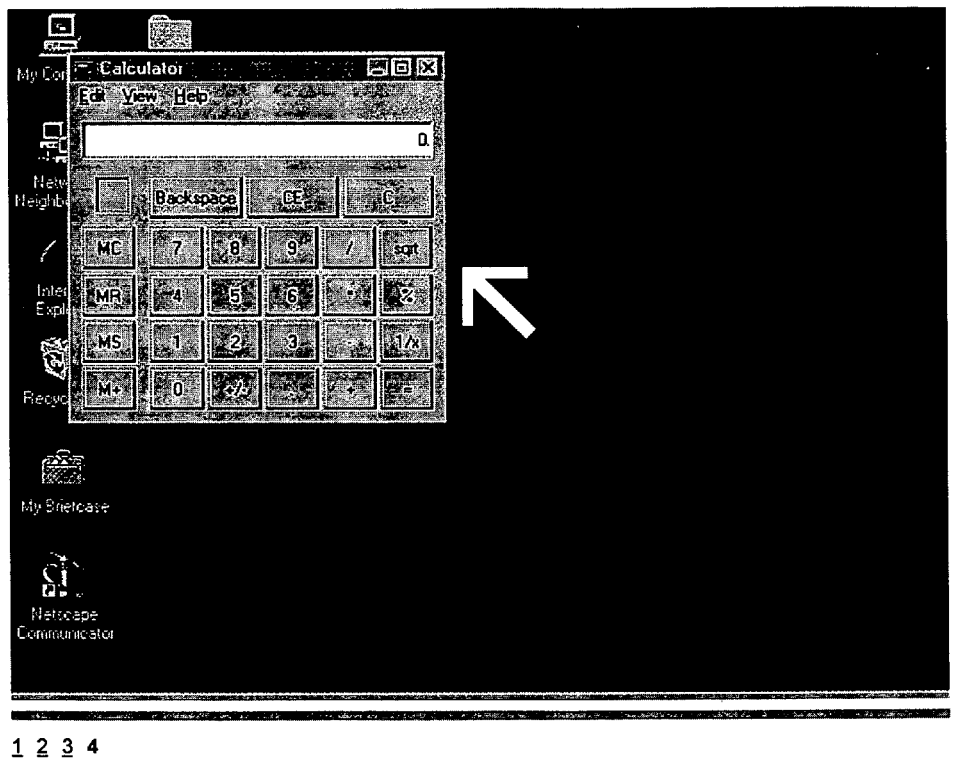
1 2 3 4
Text Author: Joe Orr   Copyright 2000 All Rights Reserved   Screenshot By: Joe Orr
Created with ScreenBook Maker   Additional Trademark and Copyright Information

Figure 12

```
01  <?xml version="1.0"?>
02  <screenbook>
03    <title>Simple Screenbook</title>
04    <category>Test</category>
05    <subcategory>Test Category</subcategory>
06    <format>Lab</format>
07    <pages>
08      
09        <text>
10          <span id="pagetext"><p>This is the Windows Desktop.</p>
11            <p>Doubleclicking on the Calculator icon
12              will cause the Calculator program to start.</p>
13          </span>
14        </text>
15        <picture width="640" height="480">pic 1.png</picture>
16        <title>Windows Desktop</title>
17        <author>Joe Orr</author>
18        <sauthor>Joe Orr</sauthor>
19        <cp>Copyright 2000 All Rights Reserved</cp>
20        <authoremail>orrj@jserv.com</authoremail>
21      
22      
23        <text>
24          <span id="pagetext">
25            <p>This is the Windows Calculator.</p>
26          </span>
27        </text>
28        <picture width="640" height="480">pic 2.png</picture>
29          <title>The Windows Calculator</title>
30        <author>Joe Orr</author>
31        <sauthor>Joe Orr</sauthor>
32        <cp>Copyright 2000 All Rights Reserved</cp>
33        <authoremail>orrj@jserv.com</authoremail>
34      
35    </pages>
36  </screenbook>
```

Figure 13

```
01   <?xml version="1.0"?>
02   <xsl:stylesheet xmlns:xsl="http://www.w3.org/TR/WD-xsl">
03   <xsl:template match="/">
04   <html>
05   <body>
06   <h2>
07     <xsl:value-of select="screenbook/category"/>
08     : <xsl:value-of select="screenbook/subcategory"/>
09     : <xsl:value-of select="screenbook/title"/>
10   </h2>
11   <xsl:for-each select="screenbook/pages/page">
12     <xsl:apply-templates select="text/*">
13       <xsl:template>
14         <xsl:copy>
15           <xsl:apply-templates select="@*|*|text()"/>
16         </xsl:copy>
17       </xsl:template>
18     </xsl:apply-templates>
19     <br/>
20     <img>
21       <xsl:attribute name="src">
22         <xsl:value-of select="picture"/>
23       </xsl:attribute>
24     </img>
25     <br/>
26     <small>
27       Author: <xsl:value-of select="author"/>
28       <xsl:value-of select="copyright"/>
29     </small>
30     <br/>
31     <hr/>
32     <br/>
33     <br/>
33   </xsl:for-each>
34   </body>
35   </html>
36   </xsl:template>
37   </xsl:stylesheet>
```

Figure 14

```
01  <html>
02  <body>
03  <h2>
04  Test : Test Category : Sample Screenbook
05  </h2>
06  <span id="pagetext">
07  <p>This is the Windows Desktop.
08  </p>
09  <p>Doubleclicking on the Calculator icon will cause the
    Calculator program to start.
10  </p>
11  </span>
12  <br />
13  <img src="pic 1.png" width="640" height="480" />
14  <br />
15  <small>
16      Author: Joe Orr
17  </small>
18  <br />
19  <hr />
20  <br />
21  <br />
22  <span id="pagetext">
23  <p>This is the Windows Calculator.
24  </p>
25  </span>
26  <br />
27  <img src="pic 2.png" width="640" height="480" />
28  <br />
29  <small>
30      Author: Joe Orr
31  </small>
32  <br />
33  <hr />
33  <br />
34  <br />
35  </body>
36  </html>
```

SCREEN BOOK MAKER

TECHNICAL FIELD

The present invention relates to an instructional book and online program. More particularly, the present invention relates to a program for the creation of instructional books containing snapshots of computer screens and for a system of using snapshots of computer screens as questions and answers in tests.

BACKGROUND

Perhaps the biggest problem currently facing industry in the U.S. is providing computer training and testing. Computer programs are becoming essential to more and more businesses and people. Programs are constantly changing, at an ever increasing rate. For every new program or version of a program released, management must decide either to stay with the old program or adopt the new release. Staying with the old program involves the risk of using a solution that is less efficient, less powerful or simply less popular than that used by the competition. On the other hand, adopting a new program involves costs attendant to such a change, for example, training costs and disruption to business activity by time spent learning and adapting to the new program. Also, companies must train new employees to use the computer systems which the company has adopted. A significant cost of doing business is related to computer training.

Training is critical not just for companies and individuals seeking to learn how to use a given product. Software makers also often create training programs and certifications to ensure that there is an adequate supply of qualified personnel for a product. It is critical for these software makers to create training programs soon after the product is released, and to create examinations for the certifications that are an effective measure of mastery of the product.

A need exists for a type of computer training that is highly effective and yet inexpensive and quick to create. Moreover, a related need exists for a method of evaluating how well the student has actually learned the material covered in the training and whether the student can apply the training to an actual situation.

Various types of training and of learning materials now exist. The main modes of instruction now available are textbooks, lectures, videos, or computer based learning (or some combination thereof). Without going into an exhaustive analysis of all possible types of training and combinations of learning methods it may be simplest to focus on what factors make it easier for users to learn quickly in a situation where technological change is both rapid and urgent. The following are the main points to be considered by management or by individuals when choosing a training or learning method:

1. Is the material self-paced? If so, this means that classes do not have to be scheduled, and people who can learn quickly are not held up by those who cannot.
2. Can the learning take place at the student's choice of location? It is an advantage if the training can be done at the student's desk or office rather than requiring travel to a special location.
3. Is the material affordable, i.e., is it within available budget? Is there a more cost-effective training tool?
4. Is the material available? Obviously, even if it has been decided that video instruction is best, this will not be relevant if a video for the requested subject matter has not yet been created or is otherwise unavailable for use.
5. Is the material in a standard format? The more familiar the format is, the less time will be required for learning, and the more receptive students will be.
6. How effective is the material? A printed book might be cheap and usable as self based training, but a book might be less effective than a video, because a well made video can demonstrate a technique in a computer application rather than simply describing it.
7. Is the training interactive? Active participation is generally a more effective tool as the student must actually exercise the skills.
8. Is the training verifiable? Does the training provide testing which demonstrates that the student has mastered the subject?

When comparing textbook instruction, lectures, video instruction and computer based instruction, a number of comparative advantages and disadvantages with respect to the above points can be seen. Lecture based training has numerous disadvantages which are obvious from consulting the above list. Simple printed instructional matter is the cheapest to create and distribute. Students can consult a text at any time and no special equipment is needed for viewing. However, printed instructional matter by itself is generally not as effective as is a more interactive media.

Videos and some types of interactive computer tutorials have great advantages. (Examples of interactive computer tutorials are tutorials created with Macromedia Courseware or Director. Examples of videos are those made by Keystone Learning Corporation.) Much of current software consists of using a graphical user interface. A demonstration of this software via a video or computer-based format is far more effective than reading a description or attending a lecture. Videos have an advantage over computer-based tutorials in that they tend to be cheaper to create than interactive computer tutorials. Videos have a disadvantage in that they are not interactive. Videos and most interactive tutorials have a significant disadvantage when compared to a book: videos and computer tutorials do not have random access (you can flip a book open to any page, but you cannot easily jump directly to any spot in a video or in an interactive computer tutorial that resembles a video).

Fairly recently publishers have come up with a format that combines all the advantages of a book with most of the advantages of a video or interactive tutorial, and thus has unique advantages when considered with respect to the points enumerated above. This format consists of small amounts of text with snapshots of a computer screen (screenshots). Tasks are described step by step. Each step has a corresponding picture.

Some examples of this format are:

Easy Microsoft Windows 2000 Professional (Que Easy Series) 2000 Shelly O'Hara ISBN 0789721872

Directory 7 For MacIntosh and Windows (Peachpit Visual Quickstart Series) Andre Persidsky ISBN 0201353989

Master Office 2000 Visually (IDG 3-D Visually Series) Ruth Maran et al ISBN 0764560506

For the purpose of this explanation, we will call such books (books in which computer tasks are visually described through actual screenshots) "visual tutorials".

Printed visual tutorials still have some disadvantages. They are expensive for organizations or individuals to create. They are usually not in electronic form, so they are not electronically searchable and cannot be easily shared.

Currently, it is possible for users to manually create a kind of HTML (hypertext markup language) visual tutorial using tools such as Microsoft Front Page. However, inserting a screenshot into a web page requires first using the PrtScrn key to copy the screen to the clipboard, using a graphics program to take the screenshot from the clipboard and transfer it to a PNG (portable network graphics) file, and then using FrontPage to insert the screenshot into a single webpage. The page numbers and links must be created manually, depending on the web page creation software being used. The user must manually change the screen resolution if so desired. This visual tutorial creation method is laborious and does not result in a standard layout and design, since each user has to decide how to create the links from one page to another, where to put the text, how to distribute the book, and so on. Further, most users do not know how to manually create a visual tutorial as described, and they also may not have the required graphics and HTML creation software installed on their machines. The present invention not only makes all steps in the process of creating a visual tutorial automatic, it also allows users to create formats for the books separately, and then create from these formats multiple versions of a page from a single master page. Further, this page can be created in any industry standard format, including RTF and PDF, not just HTML.

In addition to tutorials, there has been a need for an effective test method for truly evaluating whether a person has mastered a subject such as networking or systems analysis. Further, certain companies conduct certification testing which is to test whether the student possesses the basic ability to perform certain jobs. This testing has generally been conducted on a multiple choice format. Such a format does not necessarily establish that the student can perform the required actual work. Also, since there are a limited number of questions and there are sources which collect and distribute the questions, students are able to study for the test without comprehending the subject. Thus, there has been a need for a method to test students which more closely approximates the actual situation and requires the student to actually manipulate the programs for which certification is sought.

There is a need to provide a tool for creating and distributing visual tutorials that makes it easy for even the average user to create and distribute such tutorials, and allows such tutorials to be created in either electronic or printed form, and in multiple designs and formats. This is what the present invention does. The present invention also extends the visual tutorial format to take advantage of all of the possibilities inherent in an electronic, online media as opposed to the printed media, and in an interactive media (a computer program) as opposed to a static media (a printed page). One such extension is to allow the visual tutorials to be used as interactive test. That is, the present invention creates a visual tutorial which is more than just a visual tutorial in electronic form. Thus, the present invention is one which allows users both to easily create visual tutorials (thus having advantages over existing means of creating such tutorials) and is also one which extends the possibilities of the visual tutorial format.

SUMMARY OF INVENTION

The present invention contains features such as automatic (direct) screen capture that allow users to easily create online and printed visual tutorials. In fact, the software of the present invention makes the creation of these visual tutorials so easy that even the average user can quickly make an effective tutorial in their area of expertise. The present invention also automates the creation of pages in HTML, PDF (portable document format), RTF (rich text format) and any number of electronic formats, and the pages can be printed from the program or from any standard program for viewing such formats.

In addition, the present invention also provides the advantage of a program that makes it easy to publish, share, and work collaboratively on visual tutorials or any other kind of electronic book created by the software. Users can use the software to create online books and visual tutorials in a standard design, and can make their own page designs using XSL templates. The software communicates with a website and can upload and download books from the default website or any other website. The design of the online books created by the software allows users to share books or even single pages, with all authoring, copyright, or any other desired information retained by each page.

In yet another aspect the present invention extends the visual tutorial format to allow visual tutorials to be used interactively, not just as static reading material. This makes the visual tutorial become a means of evaluation, and not just a means of learning/training. The present invention allows for a testing format which better tests the abilities of the student. Further, the present invention allows for a number of different testing formats depending on the purpose of the testing. For example, it allows for easy self grading by the student, or for grading by a third party which may be done on the student's site or remotely.

The present invention provides a computer program which accepts text input and an image input and directly creates a page in a common internet language such as HTML or XML. "Common internet language" as used herein means a computer programming language that is a standard or common programming language designed to facilitate communication between the different types of computers and operating systems found on the internet and specifically includes all versions of HTML, XML (extensible markup language) and PDF (portable document format). The present invention also preferably includes program code to store a series of created pages with assigned page numbers and which allows a user to recall the pages in any desired order. Thus, unlike a video, the present invention provides a visual tutorial having many pages which can be displayed nonlinearly so that the user may go directly to the page of interest.

In another aspect, the present invention provides a computer program useful as a testing vehicle. An instructor creates one or more master pages as described above, each of which has a textual instruction and an image illustrating what a computer screen looks like when the instruction is correctly performed. The program saves these master pages and the program allows a student to display just the textual instruction. The student then attempts to perform the instruction and inputs his or her response as an image to create an answer page. Alternatively the image of the master page may be displayed and the student supplies the text to create an answer page. The program code then allows the master page(s) created by the instructor to be displayed so that the master page(s) can be compared with the student's answer page(s). Alternatively, the instructor can prepare a page with just text, and the student then will retrieve the text and submit a snapshot of a computer screen as an answer, with the opinion of saving it with the text to create an answer page.

In yet another aspect, the invention relates to a system for the remote access of a database and allows new books or new pages to be downloaded to the database, or the uploading of books or select pages of books from the data base. The user accesses the database and can deposit a book or can download an existing book or individual pages from existing books. Thus, the invention relates to providing a system to increase the access and distribution of the books. In a preferred embodiment, access can be controlled to limit the user's access as desired. Further, the on-line system allows for remote testing. A student can access the database and download a test book having just the text or image portion displayed. The student then completes the pages and submits his answers pages. The test can be graded either by an instructor who accesses the student answers and compares them with the master book, or the student can self grade his/her test by accessing the master and comparing the master with his/her answers.

In another aspect, the present invention relates to providing a database containing individual pages of books. In a preferred embodiment, a website is provided which functions as a remote site and which can be accessed by a user at a local site. Preferably, the remote sight includes a user database which is a list of authorized users of the database and can further store qualification information for a user. The database or file system having the database of pages of books can include a field for user clearance and classification. In this manner user access is limited to qualified users and the user's access to pages, the ability to copy and/or edit pages is limited to those activities the user has been authorized to perform.

In yet another embodiment, the invention provides a system where a user at a remote site can access a remote database, retrieve individual pages from one or more books in the database, and create new books by (a) making a new combination of existing pages, (b) editing existing pages, (c) creating new pages or (d) a combination of above. In yet another aspect, the present invention provides testing methods where questions in the form of text are stored as records in a database. The database is accessed and then each question is presented to the user and prompts the user to supply an answer. The user selects a snapshot of a computer screen as an answer and submits the answer. The answer is saved in the database and a grader can access the database and review and answers.

BRIEF DESCRIPTION OF THE DRAWINGS

The invention will be understood with reference to the detailed description in conjunction with the drawings;

FIG. 4 is a view of a computer screen with the input text screen hidden.

FIG. 6 shows FIG. 5 with the input screen hidden.

FIG. 12 is an illustration of pages created by the present invention.

FIG. 13 is an illustration of an XSL file used in the present invention.

FIG. 14 illustrates HTML output.

DETAILED DESCRIPTION OF THE PREFERRED EMBODIMENT

In its simplest application, the present invention automates the creation of a page containing screenshots. First, the process of creating a single page with a screenshot (a snapshot of the computer screen) will be described. Creating a series of pages to form a book will be discussed later. Like numbers in the various Figures refer to like items.

Figure 1:
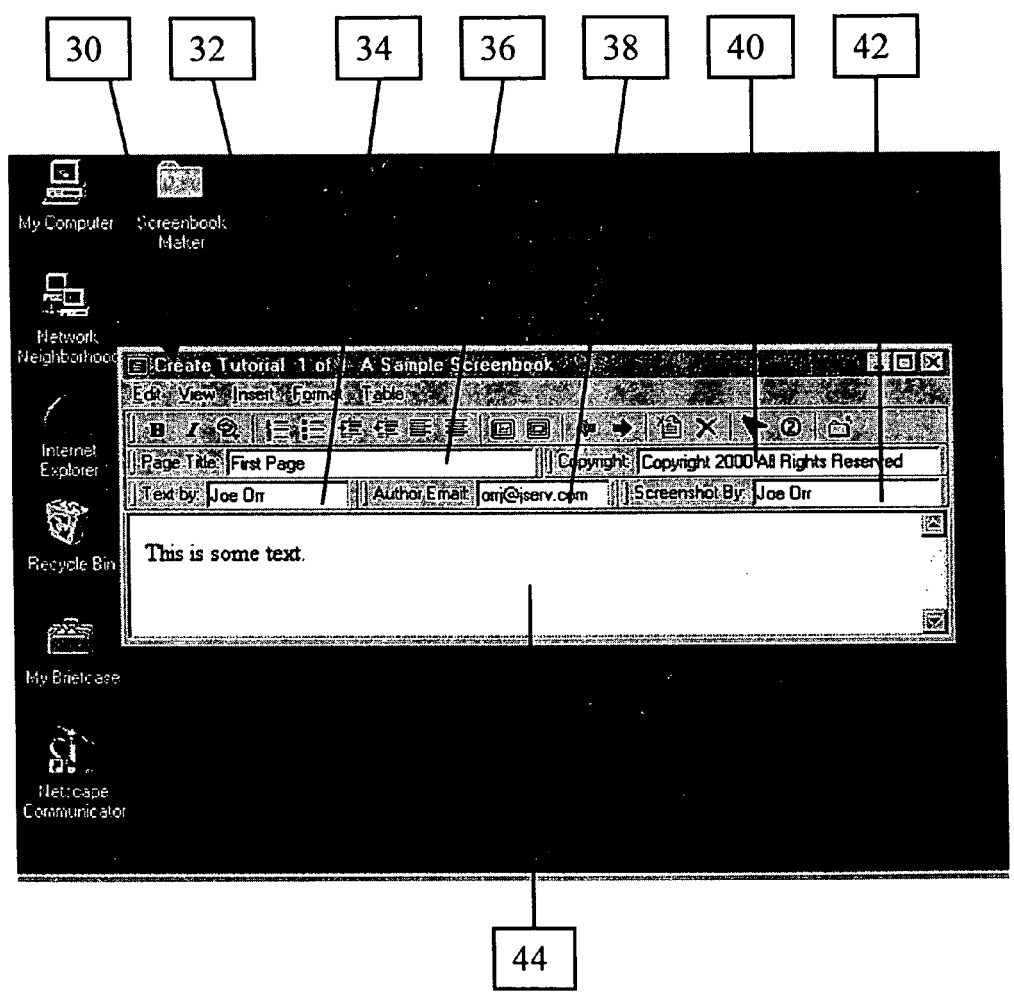
FIG. 1 is a view of an input screen of the present invention.

The program is started, and generates an input display which prompts the user to input informational text. This text will be a description or explanation of the screenshot along with any other desired information such as author, page name, copyright information, and so forth. The input screen of the preferred embodiment is illustrated in FIG. 1. The input screen 30 is preferably a floating screen which remains on top of other applications. For example, a portion of a Window's desktop (32) can be seen in the background of the illustration. Input screen 30 may be any desired size and can have the typical windows controls allowing it to be resized or closed. In the embodiment shown, the input screen displays prompts for the user to input the predetermined information. The screen has a prompt 34 for the input of the name of the page author, prompt 36 for input of the web book title, prompt 38 for the author email, prompt 40 for input of copyright information, prompt 42 for input of the figure author or source, and a section 44 for input of text.

Figure 2:
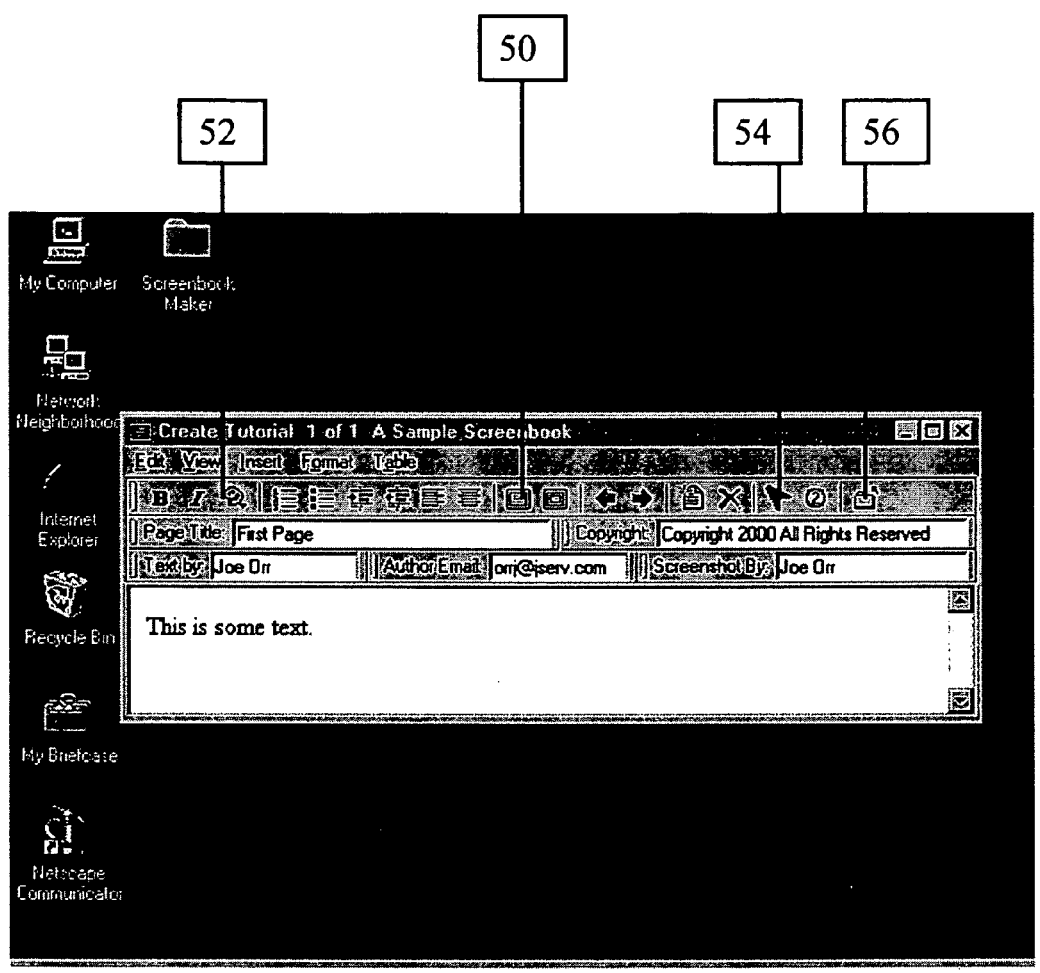
FIG. 2 is a view of an input screen of the present invention.

The input screen also preferably includes control buttons for initiating various functions of the program. FIG. 2 again shows the form displayed in FIG. 1, but with a tool bar with various control buttons indicated. Screen capture button 50 is pressed when the user has completed the input screen to his or her liking and would like the program to capture the screen and insert this screen picture into a page. Other controls useful for the creation of screen snapshots and text formatting may be present. For example, FIG. 2 shows other buttons such as an indicia control button 54 for a floating arrow or other type of indicia for indicating points of interest on the screen, and a control button 52 for changing the font color of the description text inputted into the description input box. Controls do not have to be in the form of buttons but can be of any desired type, such as a menu. Also, as is well known in Windows applications controls may be provided in multiple forms such as drop down menus, mouse pop up menus, tool bar buttons, keystroke combinations, etc. For clarity and brevity the invention will be described only in reference to button controls. The screen as a finish button 56 the user presses when finished inputting data.

Figure 3:
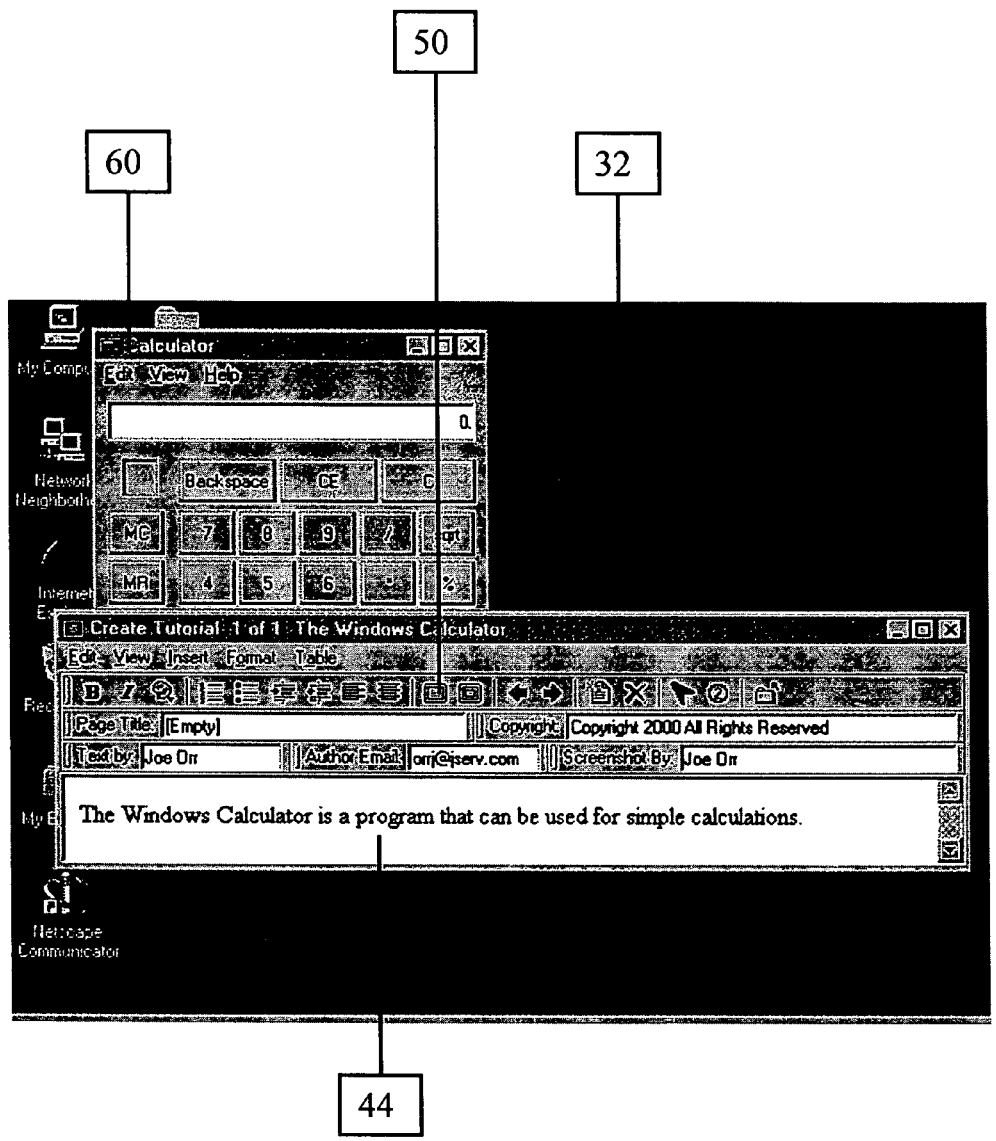
FIG. 3 is a view of a computer screen with the calculation in the background and input screen floating.

FIG. 3 shows a sample page with the inputs before the user activates the command to cause the program to make a completed page from the inputted text and a snapshot of the screen (minus the input form). In this case, the user has entered the text "The Windows Calculator is a program that can be used for simple calculations" in the input text box 44. The user has also arranged the screen (with the exception of the input form, which is automatically hidden when screen capture occurs) so that the screen illustrates the text. The screen has been arranged so that the Windows Calculator program (60) appears by itself with a backdrop of the Windows Desktop (32). (This example applies to the Microsoft Windows operating system, but the explanation is similar for any modern graphical operating system.)

Referring to FIGS. 3 and 4, after the user presses the page creation button 50, the program code automatically captures the screen, converts the captured image to a PNG or other image file (such as JPEG (joint photographic experts group)) and combines this image (80) with the text information (the description 86, copyright 84, author name 82, etc.) into a finished page. In the preferred embodiment, this finished page is stored as a set of data items in any standard data storage format, such as XML, a record in a database, or in some analogous way. This neutral format is then converted into any number of standard output formats for viewing by a user. The output page may be created directly without storage in a neutral format as well. For example, the output page can be in any number of formats such as PDF, RTF, or HTML and can be viewed or printed from the program or from external programs. FIG. 4 shows an HTML page created from the input screen shown in FIG. 3. The program has created an image of the screen, taken the inputted text, and created an HTML page. The HTML page can be viewed directly from the program or from any browser, or can be printed.

Figure 5:
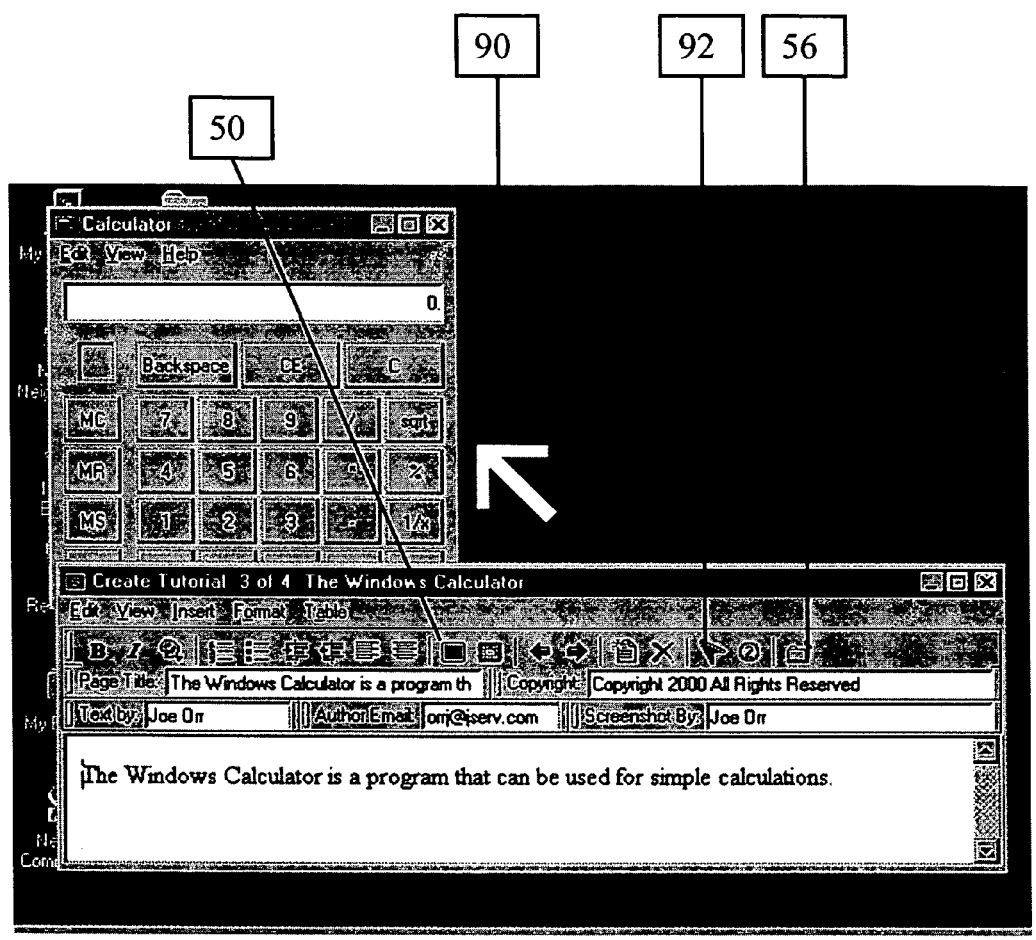
FIG. 5 illustrates the floating arrow function of the present invention.

FIG. 5 shows the same input form as FIG. 3 and contains indicia control button 92. FIG. 5 is an illustration of the screen display after the user has pushed indicia control button 92 to cause a floating arrow 90 to be displayed. This arrow 90 can be moved by the user to the proper position to indicate a point of interest on the screen. When the program captures the screen, this arrow will also be captured in the screen image. Obviously, indicia other than an arrow can be employed.

FIG. 6 shows the page created by the user pressing the screen capture button 50 when the input form is as displayed in FIG. 5.

Figure 7:
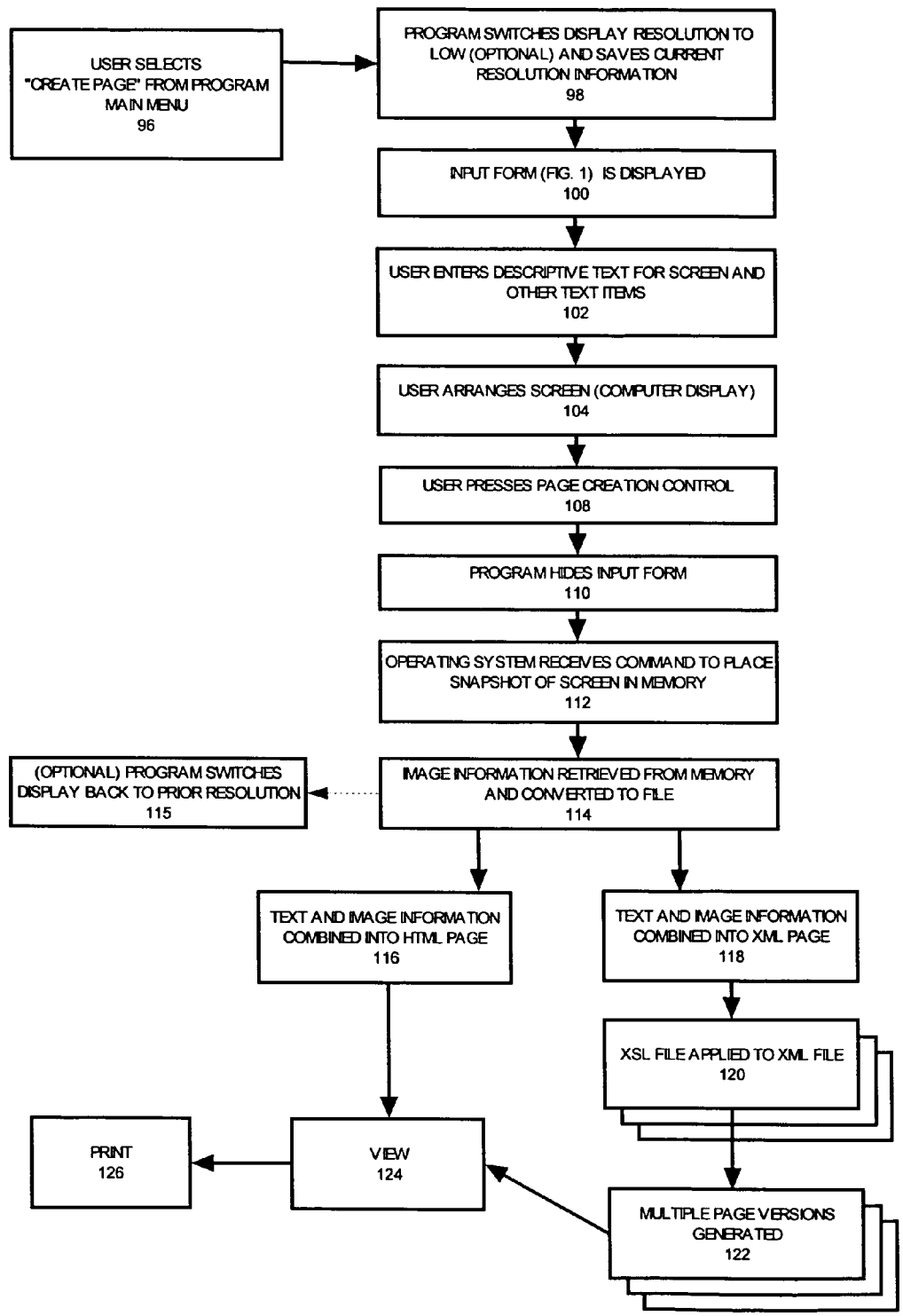
FIG. 7 is a schematic diagram of one embodiment.

FIG. 7 is a flow chart of the program code for an embodiment of the present invention. The user of the program initiates the page creation process by making a selection step (96) from a menu or other control in the programs' main interface. First, this can optionally cause the program to set the computer display into low resolution. Setting the computer display to low resolution results in screen snapshots with a considerably smaller file size than those of higher resolutions. If the program is configured to change the screen resolution it will also save the current resolution before changing so that the current screen resolution can be restored when the user is finished creating pages. Next, the program displays an input form at step 100. The input form, as previously described, has inputs for a description of a screenshot and other inputs for author and copyright, etc. The user inputs the proper descriptive text for the page and also inputs any other text items as desired, step 102. The user then arranges the screen as desired to match the descriptive text step. For example, if the descriptive text entered by the user is "Open the Windows Calculator", then the user would close all other programs and open the Windows Calculator.

When the program user is satisfied that the screen is properly set up for a snapshot, the user presses a button or other control to signal to the program to create the page at step 108. The program then hides the input form in order to prepare the screen for taking a snapshot in box 110. Next, the program causes a snapshot to be taken by signaling to the operating system to place an image of the screen into memory in step 112. (This step depends on the operating system and could be different on different platforms). After the image information has been placed in memory, the program retrieves this information and converts it to a file. In the preferred embodiment, this file is a file in the PNG format in step 114. Which is accomplished by a standard image file format component such as TiffKit (made by Informatiks, Inc.) on the Windows platform or ImageMagick on the Linux platform. The program can at this point restore the screen resolution to its original setting if this resolution has been changed in step 98. The program is now ready to create a page. The program can combine the text information retrieved with information about the file to directly create an HTML file in box 116. In a similar fashion, the program can create an XML page which can then be used to create other (output) pages from the same text and file information.

In the preferred embodiment, these additional pages are created by applying transformation instructions in the form of XSL (extensible stylesheet language) files in box 120. Multiple XSL files can be applied sequentially to one XML file, resulting in multiple HTML files with different formatting (for example, different colors and fonts) and/or in multiple output formats, such as PDF, RTF or TIFF (tag image file format) files. The XSL is applied to the XML via such third-party XSL processors as Microsoft's MSXML.DLL or the Saxon XSL processor.

Since the program in its preferred embodiment creates a page as a set of predefined items including typically an image, text describing the image, and associated items, it should be noted here that the term "page" as used in this document shall be defined as follows:

A page is a set of items which includes one or more of the following:
 a. text
 b. an image which is an illustration or is in some way related to a text item
 c. other items depending on the configuration of the program: for example, an author item or a page title.

Therefore, a page as considered from the standpoint of the operation of the program can be something different than a page that will be viewed by the user. A web page or printed page for a user to view is created from a program page as defined above, and multiple output pages can be created from a single program page. Except where otherwise noted, the term "page" is defined as the page created by the program, that is, as a set of predefined fields as enumerated above. The term "output page" will be used to specify a page created for the user from a program page. Output pages may be directly created by the program, but in the preferred embodiment, the program stores pages in output-neutral formats such as XML or as rows in a database. Typically a "page" will be stored as an XML element containing subelements. An "output page" will typically be an HTML file, but could take many other forms, as for example, a PDF file or a printed page.

At this point in the process, one page or multiple pages have been created. Since the output format of these pages are all standard formats such as HTML, PDF or TIFF, they can easily be viewed and printed from standard external programs. However, the preferred embodiment contains an integrated HTML viewer with plug-ins to this viewer available for PDF, TIFF and other files. The output page can be printed from this viewer. Additional pages with new text and images can be created by repeating these steps. Previously created output pages can be rewritten with new XSL stylesheets, or new output versions of existing books can be created by the addition at a later time of more XSL files to the collection of XSL files maintained by the program.

Besides the creation, viewing, and printing of pages containing screenshots, the program has a second function which allows a page of the type described above to be used interactively as a test or tutorial item. In this case, a master page will have been created with text prompting the user to perform some task, such as "Open the Windows Calculator" and a screenshot illustrating this task in the manner described above. In this test mode, a form is generated by the program code that allows the user to select a page. After the user selects a page the program then displays a form containing only the descriptive text contained in the master page without displaying the screenshot associated with the page. (The program can also be configured to hide the screenshot and not the text, but in the preferred embodiment, the default is to hide the screenshot.) The text is displayed, for example "Open the calculator".

Figure 8:
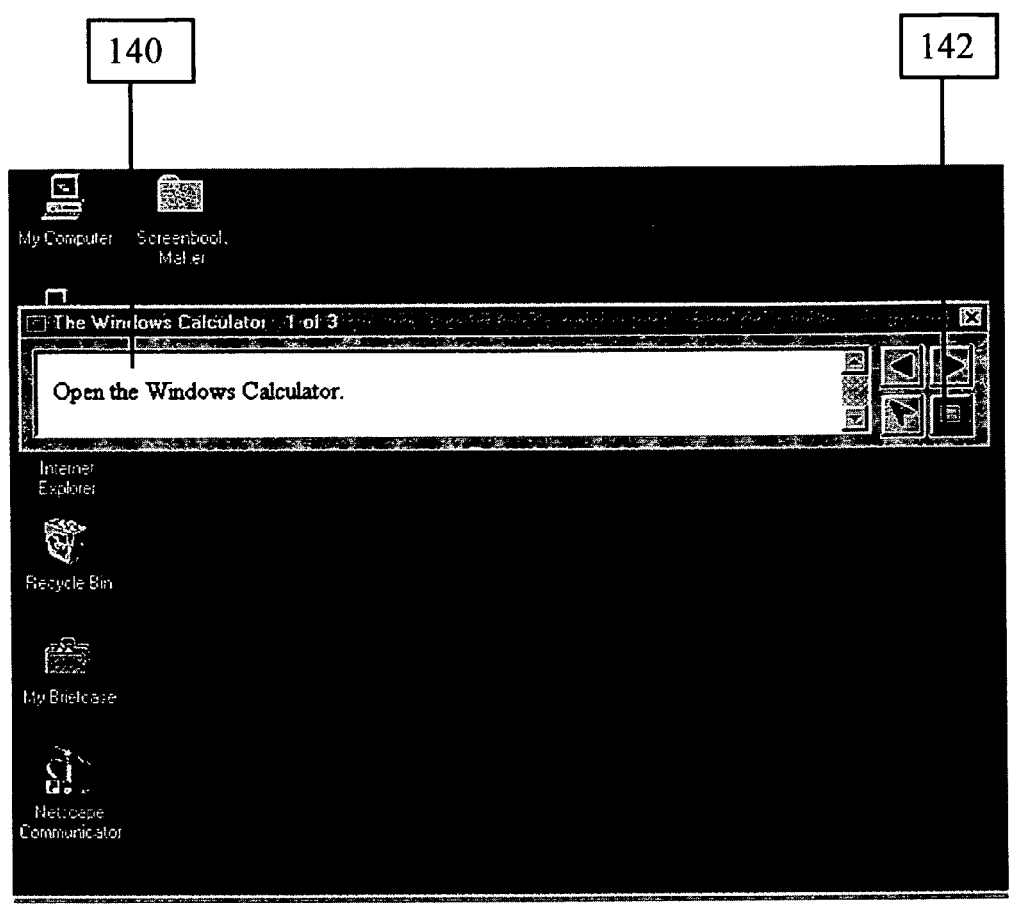
FIG. 8 is a view of a partial display of a created page.
Figure 9:
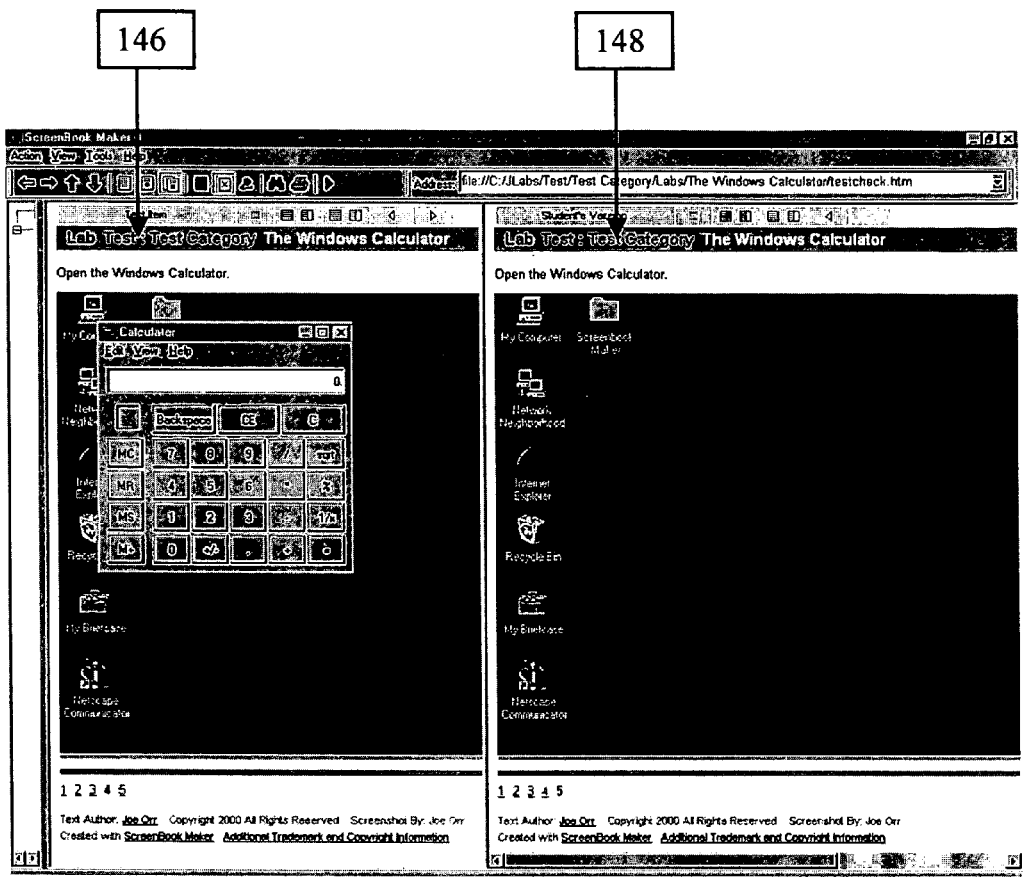
FIG. 9 is a screen illustrating the comparative feature of the present invention.

FIG. 8 shows an image of a computer screen with a sample form containing descriptive text 140. The user then tries to perform the requested task. When the user believes the screen has been properly arranged to match the text, the user presses the page creation button 142, in similar fashion to the page creation step for creating an original page described above. This causes a second page to be created (the student's version or answer page). The program then closes the input window and displays both the original page and the second page side by side. The student or an examiner can compare the correct screenshot with the student's screenshot. FIG. 9 shows an image of a screen where the original page 146 is being presented by the program in the right pane of the window, and the student's (incorrect) version is being presented in the right pane 148

A second variation on this process is possible with the program. This is the case where the text of a test item has been created, but no screenshot has been taken. In this case, creation of the student's page proceeds as above, but when the final page is created it is simply displayed, and the student or examiner can check the screenshot of the page against the text of the page rather than against a preexisting screenshot.

Figure 10:
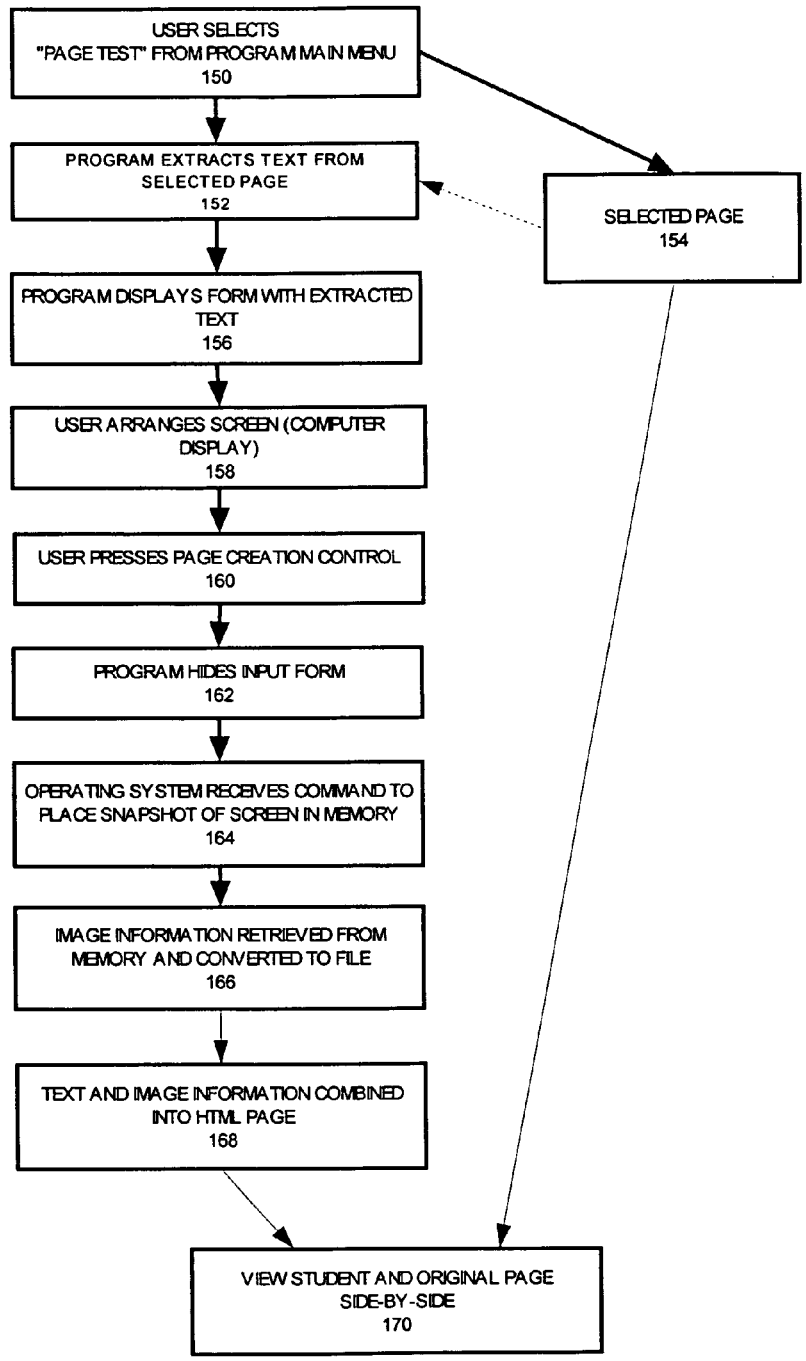
FIG. 10 is a schematic diagram of another embodiment of the invention.

FIG. 10 is a flow chart of the program code for this interactive mode of the program. The process for testing from a page is initiated by the user choosing a test item from a menu. This causes the program to extract the descriptive text from the selected master page at step 52. The program then creates a form with this extracted text and displays the form on the screen box 156. In response to this, the user arranges the screen to match the displayed text. For example, the text may be "Open the Window Calculator" and the student would close other programs and open the Windows Calculator program. When the user believes the screen has been properly arranged to match the text, the user presses the page creation button box 158.

In response to the user's action, the program then hides the input form in order to prepare the screen for taking a snapshot in box 162. Next, the program causes a snapshot to be taken by signaling to the operating system to place an image of the screen into memory in box 164 (this step depends on the operating system and could be different on different platforms). After the image information has been placed in memory, the program retrieves this information and converts it to a file. In a preferred embodiment, program code is provided to retrieve a set of test pages and consecutively prompt the student to supply the missing portion of each page and then saves each answer. In the preferred embodiment, this file is a file in the PNG format in box 166 which can be accomplished by a standard image file format component such as TiffKit (made by Informatiks, Inc.) on the Windows platform or ImageMagick on the Linux platform. The program is now ready to create the student's answer page. The program combines the text information retrieved with information about the file to directly create an HTML file at step 168 or other viewable file which is the student's answer page. The newly created HTML file, the student's answer page, and the original file, master page, box 154 are now presented side by side (box 170). In the preferred embodiment, the master page and the student page are displayed side by side; however, the invention also includes other methods of comparing the results such as toggling between the master and the student's answer pages, or the printing of the pages.

In regard to the above description it should be noted that the term "page" here has been defined as set of items including one or more of: an image, text related to the image, and other related items. So the description above describes a method of using such item sets in a question and response mode. More specifically it describes the innovation of using a screen snapshot as a response to a text prompt, for example, as the answer to a test question.

The operation of the program with respect to creating and interacting with single pages has now been described. Next, the operation of the program when creating books, that is, sets of pages, will be described.

The creation of books (sets of pages) is similar to the creation of individual pages, except that when the user presses the page creation button the program does not immediately create a page, but rather creates just the image file, and saves all of the text inputs in memory. When the user presses the finish button (FIG. 5, Item 56), the program then either creates a series of linked HTML files (one for each page) or a single HTML file (with all text and pictures included) and/or writes all of the text items and image information to an XML file. In the preferred embodiment, when the user presses the finish button (FIG. 5, Item 56) the program then writes all of the text items and image information to an XML file or other standard storage format. This operation results in the collected pages being stored as elements in an XML file. This XML file can then be processed further via XSL files or other transformation processes to produce multiple output versions in any number of industry-standard formats. The program can bypass the XML or data storage step and write directly to HTML or any other standard Internet language but the method of writing to XML first has many advantages and is preferred.

In the preferred embodiment, the program stores books simply as collections of pages. That is, each page contains all information about that page, including author, copyright information, date of creation, and so forth. Thus each page is a collection of data fields, and a book is simply a collection of pages with no additional structure or data fields. The XML file or other storage item containing a book is basically just a set of page elements (with the optional addition of some extra elements to describe the book title and date of creation etc.) Additionally, this means that storage of books in a database is straightforward: each page is one record in a database. (A record in a database is one row in a database table. The fields (column entries) in the row are the subelements of a page, such as page text, page picture, page author, and so on.)

Therefore, when storing pages in a database, in the preferred embodiment, the program code stores each page as a predetermined set of data fields in a database such as a row in a table, or as a predetermined but extensible set of information in a common internet language. Since each page in the program consists of predetermined information, e.g., text, image, page number, etc., the pages can be retrieved using searches of the various data. This program code allows individual pages from prior books to be retrieved and combined with old pages from a new book by associating the individual pages. For example a new book can be created by assembling pages into a new file or database table without adding additional information except as is necessary to identify the book, e.g. book title.

The invention allows the creation of new books by combining selected pages from existing or combining selected pages from existing books with newly created pages. This allows a new book to be created by creating a new table with existing pages. In the simplest embodiment, each book will be one table. This structure can be modified to add additional data fields each page.

Figure 11:
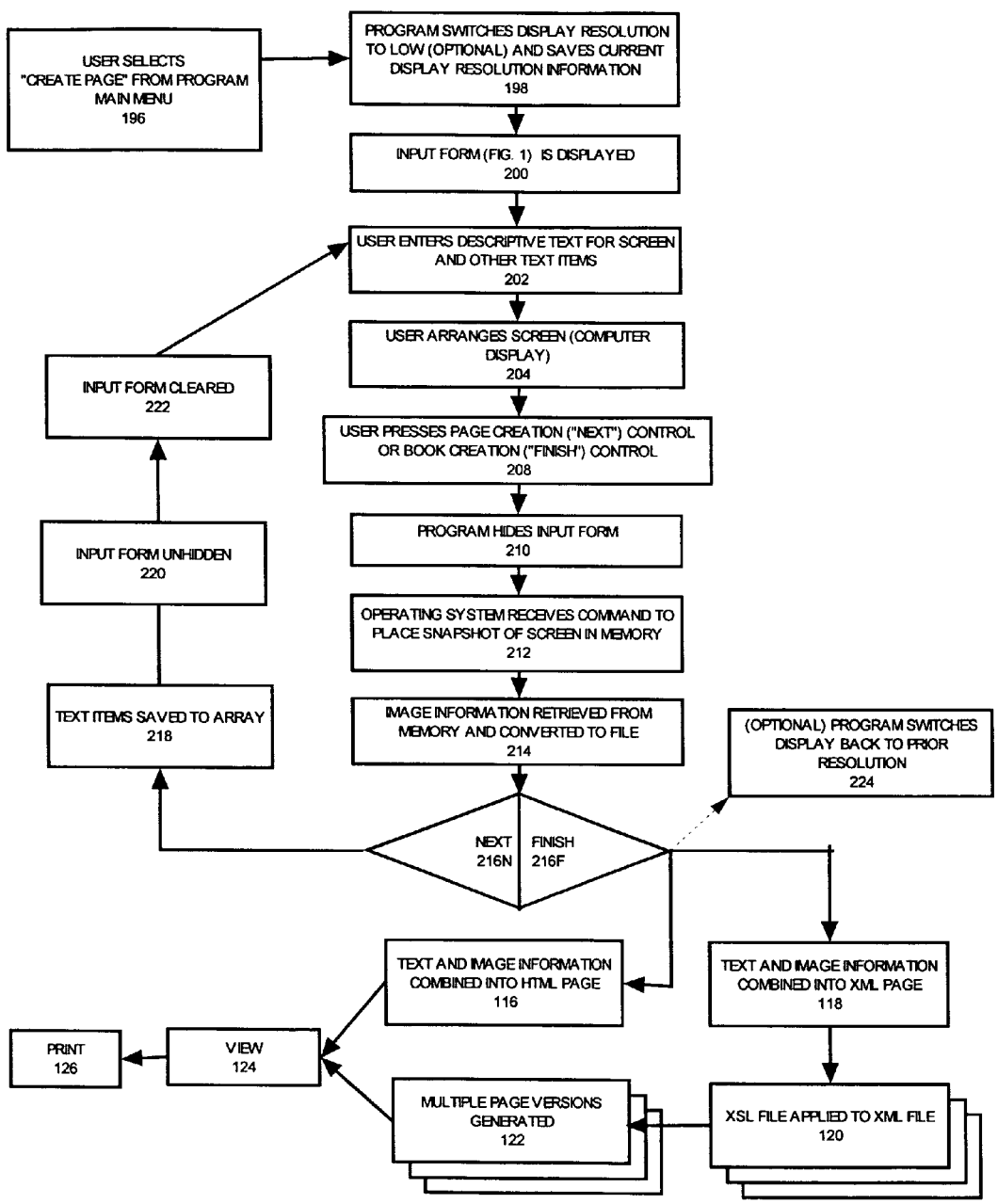
FIG. 11 is a schematic diagram of yet another embodiment of the invention.

FIG. 11 is a flowchart of the program code for the multi-page (book) creation process. The user of the program initiates the process by making a selection in box 196 from a menu or other control in the programs main interface. This can first optionally cause the program to set the computer display into low resolution in box 198. Setting the computer to low resolution results in screen snapshots with a considerably smaller file size than those of higher resolutions. If the program is configured to change the screen resolution it will also save the current resolution before changing so that the current screen resolution can be restored when the user is finished creating pages. Next, the program displays an input form in box 200. The input form, as previously described, has inputs for a description of a screenshot and other inputs for author and copyright, etc. The user inputs the proper descriptive text for the page and also inputs any other text items as desired in box 202. The user then arranges the screen as desired to match the descriptive text 204. For example, if the descriptive text entered by the user is "Open the Windows Calculator", then the user would close all other programs and open the Windows Calculator. When the program user is satisfied that the screen is properly set up for a snapshot, the user presses a button or other control. In the case of book creation, the user selects one of two controls here: either the "next" button (FIG. 2 item 50) or the "finish" button (FIG. 2 item 56). The program then hides the input form in order to prepare the screen for taking a snapshot in box 210. Next, the program causes a snapshot to be taken by signaling to the operating system to place an image of the screen into memory in box. 212 (this step depends on the operating system and could be different on different platforms). After the image information has been placed in memory, the program retrieves this information and converts it to a file. In the preferred embodiment, this file is a file in the PNG format in box 214 which can be accomplished by a standard image file format component such as TiffKit (made by Informatiks, Inc.) on the Windows platform or ImageMagick on the Linux platform.

The next step in box 216 depends on whether the user selected the "next" button or the "finish" button in step box 208. If the user selected "next", then the program branches through box 216N. It first saves all of the text items into an array box 218, reveals the input form in box 220, clears the input text boxes, and the user repeats the process of creating a page. If, on the other hand, the user chose "finish" in step box 208, then the program branches through box 216F. The remaining steps in boxes 116-126 are the same as previously described for individual page creation, except that multiple pages are created from the saved text items, rather than a single page created. By "page" we mean one screenshot with its associated text inputs. All such pages may be stored in a single XML file and then be converted to a single HTML file containing multiple pages, or each page may be converted to a single HTML file. Or, both cases could occur. An XSL file box 120 can create either a single HTML file containing all pages, or multiple files. The XSL files can also create PDF, RTF, and other file formats and page designs.

In order to clarify the concept of a "page" as understood by the program, a simplified XML version of a single set of pages is shown in FIG. 12. This book contains two pages. Each page is enclosed in an XML tag named "". The first page starts on line 8 and ends on line 21. Enclosed within the  tags are the elements (tags) for page text (lines 9-14), the picture information (line 15), the page title (16) and so forth. Information pertaining to the book as a whole is contained in lines 3-6. This XML file is then processed with one or more XSL files, using any number of third party XSL processors. A very simple sample XSL file is shown in FIG. 13. The result of applying the XSL file shown in FIG. 13 to the XML file shown in FIG. 12 is HTML, and this HTML output is shown in FIG. 14. This HTML can be viewed via any browser, or through the software of the present invention. This particular sample XSL has generated a single HTML file with all pages in that file. However, another XSL file could easily be written that would write a separate HTML file for each .

By examining the structure of XML file it can be seen that a "page" as the term is used in this document can be viewed as a single XML element with predetermined subelements. In other words a page is a predetermined set of items, typically containing an image, associated text, and other items.

Now that the creation of sets of pages has been described, it can be seen that creating sets of test items (as described above and shown in FIG. 10) is straightforward. The process is the same as for FIG. 10, except, as described above (steps 196-230), multiple pages are created by the students. The program allows selection of a set of pages, such as a book, and consecutively prompts the user by presenting the next form with the extracted information (box 156, FIG. 10), and continues displaying the next page until the set of pages has been displayed to the student. At the end of the process, rather than viewing a single page and comparing this with a preexisting page as in step 170, the user will compare multiple pages side by side. This allows a book of items to be used as a test.

The following advantages can be appreciated in the visual tutorials created by the present invention:

The tutorials are created in electronic form

Each item ("page", that is, one section of text with optionally an associated screen snapshot) can be a single XML element. (Containing other XML elements, as described above).

Each item can have associated identifying information as for example, author name and copyright. (These can be stored as subelements of the XML "page" element).

All page set information can be stored in one standard XML file.

The XML (or other technology) file can be used to generate multiple versions of HTML or other formats.

These advantages allow the present invention to be easily extended to network applications and included in a web site or other remote location where users can collaboratively create visual tutorials with the program. Because all information can be in standard XML files or other standard formats that can be sent and retrieved via HTTP to a web site or other remote location, and because each page has identifying information, users can publish visual tutorials, retrieve visual tutorials, and trade and edit individual pages created with the present invention.

Many possible methods for using the present invention for publishing and collaboration will be obvious to those skilled in the art. Several features of the present invention that allow the creation of visual tutorials to be extended to a network location will now be described, but this is not intended to limit the invention to just these network applications, since many possible network applications are inherent in the above described design.

Figure 15:
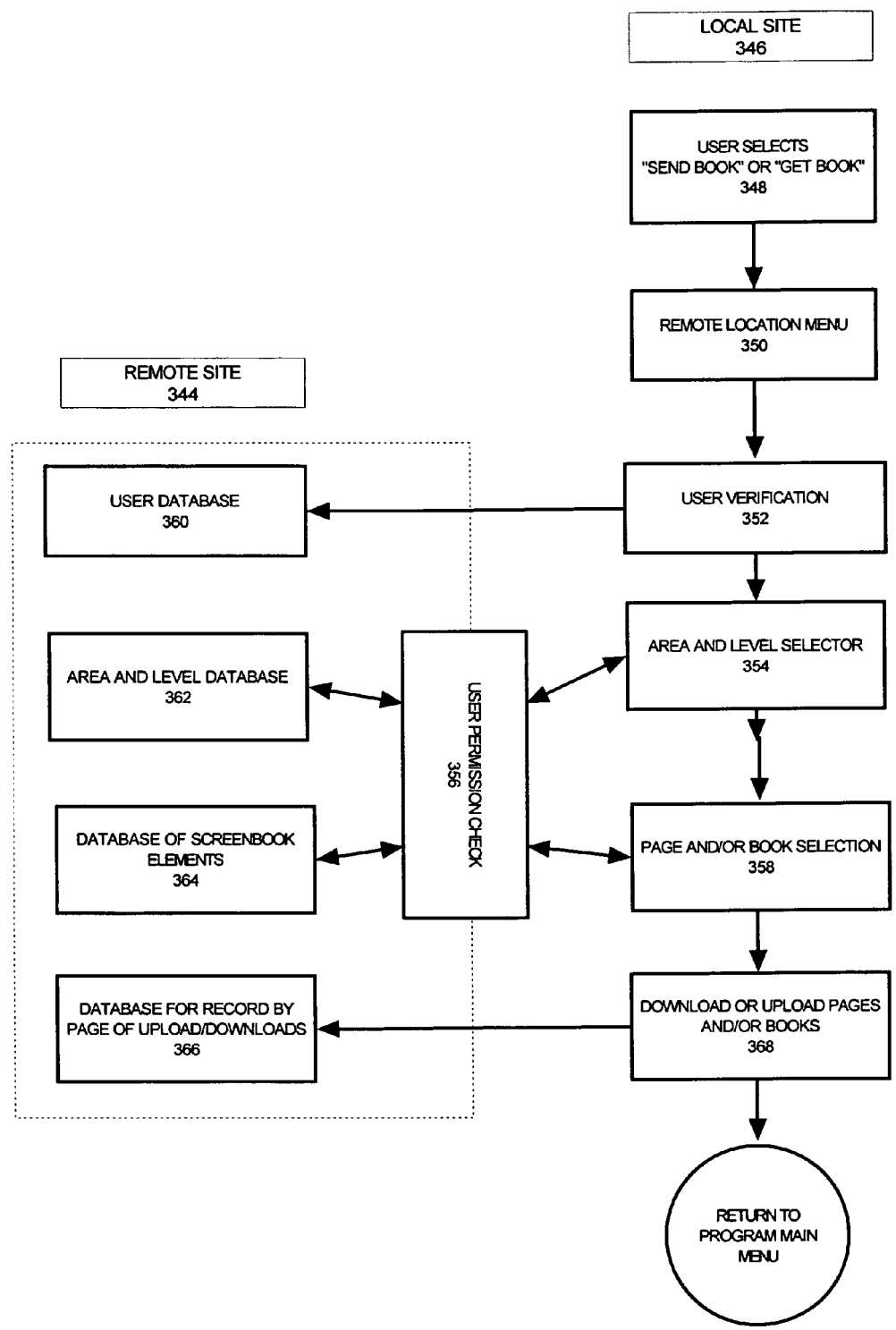
FIG. 15 is a schematic drawing of another embodiment of the present invention.

The present invention is illustrated in FIG. 15 and as previously mentioned, contains an HTML viewer (a browser) that can view HTML visual tutorials on a local site (box 346).

It also contains an FTP (file transfer protocol) client for sending and receiving visual tutorials in HTML format or any other format from the remote site 344. The software of the preferred embodiment is configured by default to connect to a particular remote site, but the user may change this setting to point the client to any other site.

In a preferred embodiment of the present invention, the default website contains a membership database 360 with a list of members, and the member's qualification to have access to different levels and areas of membership. The system also includes software to accept new user applications and registrations. Any one of several existing program systems for registration and verification can be used. For example, one area could be open to the general public and users would be allowed to join simply by choosing a user name and password. A higher qualification level could, for example, require payment of a fee, membership in a certain group, additional verification or any other requirement. Access to particular pages could be limited to specific areas of the website and an area reserved for use by users from a particular group or institution. The access to pages and use of pages can also be restricted based on the copyright use information and restrictions. For example, access could be restricted to a particular group of users or conditioned upon payment of a fee. Since in one embodiment, the client software (the software used for creating screenbooks together with program code for communications with a website) of the present invention contains FTP client capability, users can connect to the remote site and upload and download screenbooks using the client program which has the page creating functionalities described above. Program code can be provided to take care of logging users into the website (presenting username and password, or using some alternative method, such as the presentation of a digital certificate). At the same time program code as is known in the art can be provided for maintaining a record of use of the site and pages accessed by particular users.

Using the client software, the users can then, in addition to simply viewing screenbooks stored at the remote location, also edit or interactively use books either by downloading them or directly accessing them at the remote location 344 (website). For example, during the page creation and editing phase described above, the pages could be saved directly to the remote site 344 rather than to the user's hard disk or other storage media at the local site 346. Alternatively, users can "check out" (mark as temporarily locked) pages to their hard disk, edit them, and then send them back to the website. As another example of use of the program of the present invention in conjunction with a remote site, in the above case of interactive use, instead of interacting with a screenbook on the local site 346 hard disk of the user, the user could interact with a screenbook on the remote website 344. As described above the user who is a student can select to have portions of pages hidden. The student then completes the page to create his answer page. When the student user is done creating the user version of the screenbook, the result is then compared with the authoritative original master version on the website. This comparison could be done by the user, by an expert at the remote website, or the user's version could simply be posted to the remote website and other users could compare the user's version with the master version.

Since "page" here has been defined as set of items including typically an image and related text, it should be understood that this description of a user supply a missing portion of a preexisting page is also describing a method whereby for example, the user is supplying an image in response to a prompt, where the prompt is some text for which the image will be a description or an illustration and therefore, an "answer". The innovation here is that test items no longer have to consist of text prompts and text answers, they can also consist of mixed images and text, particularly snapshots of computer screens with associated text, and the software of the invention facilitates the use of a screen snapshot as a response to such a test item. Alternatively, the test can consist of pages having only text. The student retrieves the text and program code, presents a page displaying the text, and prompts the student to answer. The student then selects a computer screen as his/her answer and saves a snapshot of the computer screen as the answer by pressing or clicking on a control button or other control interface. As explained above, the program code then combines the text and the snapshot of the screen as the student's answer page.

Since many network variations are inherent in the design of the invention, an example configuration involving uploading and downloading books and/or individual pages from a website with a user database will now be described. Many computer systems can be used in the invention.

Referring to FIG. 15, in the network environment such as the internet, a local site 346 which could be a home personal computer, is connected to the remote site 344 which could be a web server. Access to the remote site 344 can be provided by any known means such as through an internet service provider or by direct access.

As illustrated in FIG. 15, the user selects either "Send book" or "Get Book" in box 348 from the client program main menu. The user next chooses from a menu of remote locations in box 350, and in the event there is only one remote location this step may be omitted. After the desired remote location 344 has been chosen, the client software then contacts the remote location and performs the user verification step box 352. This could be a simple password check, an encrypted password check, challenge and response, the presentation of a digital certificate or any other means.

Once the user has been verified, the program proceeds to a menu box 354 of areas and levels available on the remote site. The user then chooses an area and level. However, this choice must be cleared through the permissions checking facility 356 of the remote location which determines if the user qualification level meets or exceeds the qualification level required for access to the pages in the database using known programs. The member qualification levels, if any, can be selected in any number of ways. Examples of possible levels of qualification include a level that (a) permits viewing but not copying or editing (b) a level that permits copying but not editing, (c) a level that permits copying and editing, and (d) other desired limitations. If the user has proper access based on the previous sign-in box 352, the remote location box 346 will respond with a list a list of all content in the chosen area/level. The user can then choose a book or individual pages from one or many books in box 358. The user may also select "test mode" in which case a portion of the page of the book is hidden. Again, the remote location will check in box 356, whether the user can access the actual content referred to by the list. If the permissions check returns successfully, then the user can then begin to upload or download the selected items box 368 from the database of screen book elements 364. This upload or download can be recorded in a database listing all pages and uploads/downloads thereof in box 366. In the event that the user has downloaded a book in "test mode", the user then operates the program to complete the pages of the test as described above. The user may then either download the master book and compare his or her answers with the master, or upload his or her answers such that they are available to a third party for grading. Once the user has finished, the program then returns to the main menu.

In addition to being a network extension of the client program as described above, the remote site 344 can also be have additional functions that allow it to be used for the authoring, editing, and storage and publication of visual tutorials by multiple authors. Accordingly, the architecture of the remote site 344 will now be discussed in more detail.

There are many systems for storing and even editing pages on a remote site. Adding such facilities to the present invention using these well known systems and methods would be a straightforward process for anyone skilled in the art. However, the preferred embodiment of the invention allows a new method of storing and editing books. This new method is possible due to the fact that the pages created by the invention are completely self contained and thus interchangeable. This new method will be described as the preferred method for allowing a remote site to serve as a provider of an storage and editing service for remote users, but this not intended to limit the network aspect of the invention to just this method.

All "pages" created by the invention, as described above, contain all information that is known about the page, including author, copyright, date of creation and other information. For this reason, a book is nothing more than a collection of pages. Any additional desired information may be added with the optional addition of some data fields for book title, book creation date, and so on. Other than title etc, there is no information that a book contains that is not contained in the pages of the book, and each page has the same data fields as another page. (Some variation of this basic design may be desirable in some implementations. For example, it may be desirable to have information unique to a particular book to be separate from the individual pages. Also, any suitable data structure can be used provided the page is a single element. Thus, a book can be a file listing of the individual pages, with book specific information such as title page number etc as a separate record.) By structuring a book as a collection of interchangeable elements, the present invention considerably simplifies and facilitates the operation of collaborative creation of books, described below.

As described above, pages can exist as XML elements or as records in a database or in some analogous structure. The case where pages are stored as records in a database will be described below, however, the system described could equally well be implemented with pages stored in XML files or in some analogous way. In the preferred embodiment, a database systems used (e.g. Oracle 8.i or Microsoft Sequel Server 7.0) because database systems facilitate the kinds of access control described below The remote site 344 then, consists of a database 364 containing tables which contain pages of books as stored rows in the tables. The remote site will also contain other types of structures such as:
1. Membership/user database 360
2. Book—member interaction, upload, download database 366
3. Other supporting contents such as site index and other supporting content which is well known in the art.

Creating new books in such a system is a simple operation of creating a new table and copying selected pages from one table to another. Editing and deleting existing pages are likewise simple operations on database records.

Additional records can be added to pages to facilitate editing or other operations. This works as follows. Each row in a table containing pages has a data field for the predetermined information, e.g., page text, page author, etc. The remote site has the option of adding any number of additional columns to the table. For each column, conditions can be specified for any operation. For example, consider a table named "MyBook". It is considered desirable to add restrictions on copying "MyBook". In this case, the program creates a new column named "restrictions" in the table for the book. At the same time, this column could optionally be added to all book tables in the database. In the program code for the "copy" operation for a page, code can then be added to check for the existence of the restriction field and for example, if a user requests a copy of the page and the restriction field contains a value of read only, the copy operation is canceled and the user is denied access. In a similar fashion, any other type of clearance operation can be substituted or multiple restrictions or a hierarchy of restrictions can be utilized. For example, a series of levels of clearance may be adopted and the value in the restrictions field could refer to a particular clearance level, such as "clearance level 4" in which the program checks the user database to verify that the requesting user has a clearance of 4 or higher, and if the result is positive, allows copying of the page, and if the response is negative, denies a copy.

Not just levels of clearance, but any kind of restriction or other operation can be specified simply by adding a new field (column) to a book table, and specifying the meaning of that field in program code. For example, when copying, the program can check whether there are data fields in the page for which the copy operation has a predetermined response. For example, program logic similar to the following can be implemented:

If exists data field by the name of "authorization" then
  If the value of the data field is "read only" then
    Do Nothing
  Else
    Copy the page
  End If
End If This is a simple example of the clearance and authorization checking methodology which can be built upon to provide as complex a degree of clearance and level access as is desired. For example, a data field could specify that an e-mail message should be sent to the page author before copying of the pages allowed. Further, the program code may provide that the page may be copied to a new file, if it retains all the attributes that it had previously. For example, an author can specify that a page may be copied but not edited. A new copy of the page would exist in a second book but the accompanying code would not permit editing of the page. Of course, this type of control is possible only where the files containing the books are maintained on the server of the remote location. In the case where the pages are to be copied to the client machine, the page can then be edited by the user in any manner they desire.

Other types of operations can be programmed into the remote system in addition to page permissions. For example, program code can be provided in the system to maintain a record of books and member interactions. An example would be program code which keeps a record of access to pages and/or books by individual members. Each page can be provided with a separate table recording the identity of the user requesting each page or book, and other information as desired such as date of the access, etc. Alternatively, the access information can be stored in an access record table for each user. The program code for such recording keeping is known in the art.

Besides pages, the remote site can store and publish other types of information, for example, information about tests and books. The remote site program can create a table "test"

with information about a test. The table can store the test name, the name of the user who took the test, the day and time, the name of the book containing the pages which were used as test items, the final score of the test taker and any other information desired. The remote location can also be programmed to contain a database of book reviews which can include predetermined information such as the reviewer's credentials, the review and the associated book, and the rating given to the book by the reviewer. In addition, separate categories can be established for user comments in addition to reviews.

The various manners in which the system operates to use pages of books will now be described in relation to FIGS. 15, 16 and 17.

Referring to FIG. 15, the user at the local site 346 starts the client program and selects the option to activate the program block 348. The client program then provides the remote location menu (step 350) and user verification is conducted (step 352). User verification can be of any known means such as a name and password. The identity of the user is then verified by accessing user database box 360 and performing a check in a manner which is well known.

Next, in the preferred embodiment an area and level selector is displayed to the user (box 354). The user indicates the area and level that he desires access to. A user permission check routine is conducted (box 356) to insure that the user is qualified to access for that area and level. If the check is positive, access to the appropriate database of pages of screen book elements (box 356) is permitted. The user then can select pages and/or books from the menu display in (box 358). At this point, the user can use the client program to create a new screen book, create new pages for an existing book, or to assemble pages from existing books, existing books and new pages or any desired combination. Each of these operations may trigger program code that restricts or enhances the operation as described above. Once the user is satisfied with this page and/or book, he can then upload the new pages and books to the database (box 360) and the database records the new information (box 366). Thereafter, the program returns the user to the main menu.

Figure 16:
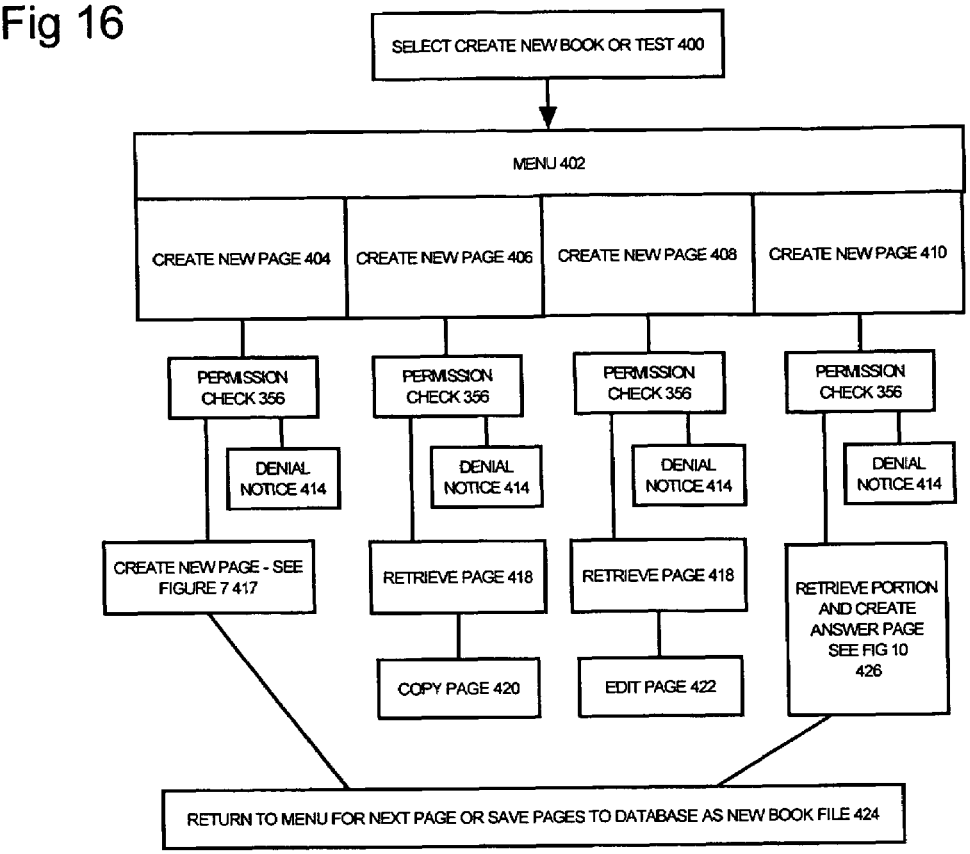
FIG. 16 is a schematic diagram of another embodiment of the present invention.
Figure 17:
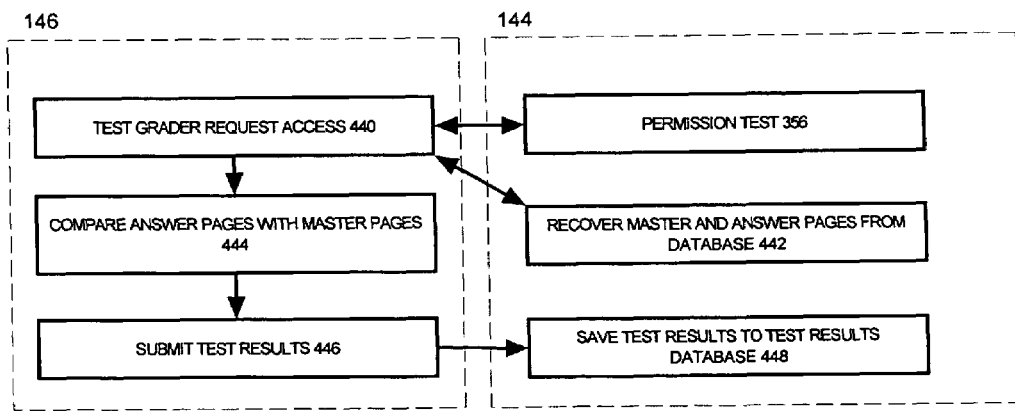
FIG. 17 is a schematic diagram of the grading system of the present invention.

Referring to FIG. 16, the user selects from the menu create new book or text 400, and displays a menu 402 with selections for creating a new page 404, copying a page stored in the database 406, editing a page stored in the database 408, test mode 410, or to exit 412. The user makes a selection of create new page, copy page, edit page or text. The system then performs the permission test 356, and if permission is denied displays a denial notice 414. If permission in granted the user can create a new page 416, or retrieve a page from the database 418. The user can create a new page as described above with respect to FIG. 7, or copy a page 420, or edit a page 422. The user can then return to the menu 402 and repeat the process as desired and when the pages of the book are completed the user can save the pages 424 of the new book to the user database 360. In this manner the user can create a book of entirely new pages, a book of previously existing pages copied from the database, or a book from previously existing pages from the database which have been edited or a combination of any of these.

The remote site can also facilitate and enhance the testing function of the invention. The testing function of the present invention is explained above in reference to FIG. 10, and the testing function may be performed online. In this embodiment, the database (box 364) contains a database of master books. The user permission check 356 provides online access to individual pages of the master book to users who are students or graders. Once a student selects the test mode, the database permits retrieval of a portion of the master pages. The student at the local site 346 views a portion of the master page, and then selects and transmits input data relating to the portion that was retrieved. The program code at the remote site creates a student page and stores it. Alternatively, the answer page could be created at the local site and then uploaded to the remote site. Referring to FIG. 16, the student has selected test mode 410, and a permission check 356 is made, if permission is denied a denial notice 414 will be displayed. If permission is granted then the system retrieves portions of master pages from the database and the student creates his answer page 426. When the student has completed his answer pages the system performs the step 424 of saving them to user database 360. Alternatively, as explained above, the test can be pages having only text and the student who retrieves the text is prompted to provide an answer. The student (by means of the program) then takes a snapshot of a computer screen—which the program submits back to the database. This submission back to the database can be by means of the program creating an answer page which is then stored back in the database, or by some other well known means of storage of the answer page in the database.

The student's answer page(s) are stored in a database (box 366). A grader from a local site 346 may access the remote site 344 and access the student's answer pages and the corresponding master pages and can compare the pages as described above. Alternatively, the student self grades the test and may compare the pages. Referring to FIG. 17, the system also has the ability to record grades by using program code which allows the grader to request access to the test results portion of the user database, box 440. The grader's request is subject to a permission test 356. If permission is granted the master pages and the student pages are recovered from the user database 360 and displayed to the grader, step 442. The grader compares the master and answer pages, step 444, and inputs test results into the system, step 446. The system then stores the test results in the results section of the user database 360, step 448. The system can allow the database of grade records to be accessed by an approved individual.

Preferably, the program code allows the students to transmit the screen capture for the answer to the remote site where the program code then creates the student's answer page. Many of the steps may be performed either at the local site or the remote site depending on the desires and preferences of the system designer.

To summarize the function of the remote site of the system, it provides enhancements to the benefits of the base program which creates the books and which allows the testing function to be performed. The method described of implementing the remote functions is made possible based on the innovation of having pages that are completely interchangeable and stored separately, although they may be associated with a particular book. It should be noted, however, that other methods of implementing the remote functions will be apparent to those skilled in the art. The system having local sites and remote sites accessible to one another allows the unique benefit of the program of the present invention, to be exploited by a number of people to permit (a) the easy creation of books with screen captures and (b) testing using a image such as a screen capture as a response to a test item, or using text as a response to an image test item, or (c) the viewing of books, all of which can be administered independent of physical location of the users. This allows more uses for the program of the present invention than would be possible on a stand alone computer. This remote site access system allows internet or intranet site users not only to simply create their own books, but to share them, and collaborate in the creation of books. The remote site also allows standardized tests to be administered to a large number of people and allows the results of the test to be collected at a central location and certified by an authoritative source.

The present invention can be implemented with any suitable computer system. An exemplary computer system will be described for illustration purposes only and the concepts equally apply to other systems including systems which have architectures dissimilar to the architectures described herein.

A useful computer system includes a central processing unit (CPU) implemented with a conventional microprocessor, a random access memory for temporary storage of information and a read only memory for permanent storage of information. The memory is controlled by a memory controller. A bus is provided to interconnect the components of the computer system and a bus control is provided for controlling the bus. The system can also include an interrupt controller used for receiving and processing various input signals from the system components. Any form of mass storage media may be provided such as diskette, CD ROM, hard drive, or later developed memory components. The computer system may exchange data and software via removable media such as diskettes or CD ROMs or by downloading the data or software from the storage media of a server or other computer network with the computer system.

The user may input instructions and data to the computer system by any known device such as keyboard, mouse, audio transducer, pen, touchpad and/or tabloid.

Output perceivable by the user can be in the form of visual display, audio signal or printed or combinations of these above. The computer system will include components and controllers known in the art to provide such outputs.

Operation of the computer system is generally controlled and coordinated by operating system software such as Windows 98, sold by Microsoft Corporation, Redmond, Wash. or any other known operating system. The operating system controls allocation of system resources and performs tasks such as scheduling, processing, memory management, networking, etc. The operating system resident in the system memory and running on the CPU coordinates the operation of the computer system. The present invention may be implemented with any number of commercially available operating systems such as OS/2, Unix, etc. The present invention has been described in the preferred embodiment designed for operation on Microsoft Windows 2000. A computer system having the program loaded thereon is used to create the screen books. The functions of the program may be distributed in a network environment such as an intranet or an internet.

I claim:

1. A method for providing on-line testing comprising:
    maintaining a database of test questions comprising at least one text item or at least one item comprising text and images;
    providing on-line access to at least one of the test questions;
    presenting to a user the at least one of the test questions describing a task to be performed using a computer application;
    receiving from the user an answer to the at least one of the test questions comprising a captured image representing a computer screen prepared by the user based on the presented at least one of the test questions, representing the status of the computer screen after the user has performed the task using the computer application; and
    automatically associating the answer with the respective test question, for each of the test questions, to create an answer set.

2. A method of claim 1 further comprising:
    providing on-line access to said answer set; and
    providing the ability to compare said answer from the user with a correct answer to the test questions.

3. A method of claim 2 further comprising:
    maintaining a record of test results based on a comparison of the answer from the user with the correct answer to the test questions.

4. A method of claim 1 further comprising:
    maintaining a database of authorized users; and
    providing the ability to deny access to unauthorized users.

5. The method according to claim 1, wherein a plurality of answers are stored in a common database.

6. The method according to claim 1, further comprising the steps of selectively defining access privilege levels for the answer set; and enforcing the access privilege levels to selectively limit access to the answer set.

7. A testing method, comprising:
    presenting to a user a test question, said test question indicating a task to be performed using a computer application and prompting the user to perform the task using the computer application to create a computer graphic responsive to the test question displayed on a computer screen;
    automatically taking a snapshot of at least a portion of the computer screen containing the computer graphic responsive to the test question, and combining this snapshot with received text to create a page comprising the received text and the snapshot represented in a common internet language; and
    storing the page in an electronic database as an answer to the test question.

8. A method of claim 7 further comprising:
    associating two or more of said pages through a stored link as a book.

9. A method of claim 7, wherein the test question comprises an original page having a plurality of portions, further comprising:
    displaying only a portion of an original page to a user; and
    automatically combining the portion of the original page and the page in a common internet language to create an answer page.

10. A method of claim 9 further comprising:
    comparing the original page with said answer page.

11. The method according to claim 7, further comprising the step of transmitting the page through a computer network.

12. The method according to claim 7, further comprising the steps of defining a plurality of pages, each referenced by a respective hyperlink in a hypertext browser-interpretable page, and interpreting respective ones of the plurality of pages based on a reference from the respective hyperlink.

13. The method according to claim 7, wherein the page comprises a format selected from the group consisting of XML, HTML, PDF, and RTF.

14. The method according to claim 7, wherein the snapshot comprises a format selected from the group consisting of PNG, TIFF, and JPEG.

15. The method according to claim 7, further comprising the step of selectively limiting access to the page based on an authorization.

16. The method according to claim 7, further comprising the step of selectively limiting access to the page according to a plurality of access criteria.

17. The method according to claim 7, further comprising the step of providing different access rules for access and editing of a plurality of pages.

18. The method according to claim 7, further comprising the steps of:
   automatically changing a screen resolution of the computer screen to a predetermined capture screen resolution different from a user screen resolution employed by the user to formulate the image, the snapshot of the computer screen being acquired at the predetermined capture screen resolution at a selected point in time, and subsequently restoring the computer screen to the user screen resolution; and
   providing an application control window, wherein the application control window is displayed before, and removed prior to capturing the snapshot.

19. The method according to claim 7, wherein said taking of a snapshot comprises capturing data from a display buffer.

20. A testing method comprising:
   displaying at least a portion of a master page using a computer process, wherein the master page comprises a set of predetermined items comprising an image and associated text, the portion of the master page being adapted to serve as a task-based test question, at least one other portion of the master page representing with a correct answer to the task-based test question;
   interacting with a user through a computer display to perform a task using a computer process distinct from the computer process which displays at least a portion of the master page, to generate an image on the computer display in response to the displayed portion of a master page, the image representing the user's answer to the task-based test question;
   capturing a representation of the image as a computer graphic file; and
   creating an answer page by automatically combining at least the computer graphic file with at least one of a reference identifying the master page, and a portion of the master page.

21. A system of claim 20 further comprising:
   concurrently displaying the at least one other portion of the master page and the answer page so that they can be compared.

22. The method according to claim 20, further comprising the step of:
   automatically changing a screen resolution of the computer display to a predetermined capture screen resolution different from a user screen resolution employed by the user to formulate the image, said capturing comprising capturing a snapshot of the computer display at the capture screen resolution at a selected point in time as the image, and subsequently restoring the computer display to the user screen resolution.

23. The method according to claim 22, further comprising the steps of providing a control window for receiving at least one of a user command and the associated information, prior to the selected point in time, hiding the control window, capturing the snapshot of the visual interface display screen, and unhiding the control window.

24. The method according to claim 20, further comprising the step of presenting the answer page to instruct a user.

25. The method according to claim 20, further comprising the steps of presenting the portion of the master page as a query having at least one correct response to the user, and comparing the answer page to the at least one correct response to provide a test grading system to provide an indication of user skill.

26. The method according to claim 20, further comprising the step of selectively interpreting the answer page to display or hide at least a portion of the answer page.

27. The method according to claim 20, further comprising the step of automatically comparing at least a portion of the image to a predetermined image.

28. The method according to claim 20, further comprising the steps of:
   grading the user based on a correspondence of the image to a reference image representing a correct answer to the test question.

29. The method according to claim 20, wherein said creating step comprises the substeps of:
   retrieving a template;
   modifying the template to insert a reference to at least the image; and
   selectively inserting a hyperlink in the template referencing the master page.

30. The method according to claim 29, wherein said creating step comprises merging a set of computer graphic files with a predefined received template.

31. The method according to claim 20, further comprising the steps of defining the answer page in XML and subsequently applying an XSL style sheet to the XML answer page.

32. The method according to claim 20, further comprising the steps concurrently presenting at least two answer pages for comparison.

33. The method according to claim 20, further comprising the step of extracting an answer page from a first presentation and embedding it in a second presentation.

34. The method according to claim 20, further comprising the step of automatically generating a book comprising respective hyperlinks targeting a plurality of answer pages.

35. The method according to claim 20, further comprising the step of automatically including metadata within the answer page.

36. The method according to claim 20, further comprising the step of selectively applying at least one selected from a plurality of transformations to the answer page for output in a respective common internet language.

37. A computer readable storage medium containing a computer program for carrying out the method according to claim 20.

38. A testing method, comprising:
   presenting a test question to a user, said test question prompting the user to perform a computer-based task to create a computer graphic image dependent on a skill of the user and a computer application responsive to the test question through a graphic user interface, the computer graphic image comprising at least one user-defined portion and at least one computer-defined portion;
   automatically acquiring the computer graphic image representing at least a portion of a the graphic user interface computer screen generated by the computer application containing the computer graphic image responsive to the test question, and modifying a common internet language page template to create a page referencing the computer graphic image and being associated with associated with at least one hyperlink dependent on the respective test question;
   storing the page in an electronic database;
   assessing a skill of the user by referencing the page and analyzing the computer graphic image;
   storing the assessment in a database in association with an identification of the user.

39. The method according to claim 38, wherein the user has a first set of rights relating to access and modification of the page, and an assessor has a second set of rights relating to access and modification of the page, the first and second set of rights being different.

40. The method according to claim 38, wherein the automatically acquired computer graphic image has a predetermined resolution which is selected independently of a graphic user interface resolution used by the user to create the computer graphic image.

* * * * *